United States Patent [19]

Weyts

[11] Patent Number: 4,680,069
[45] Date of Patent: Jul. 14, 1987

[54] METHOD FOR THE FABRICATION OF A DOUBLE-WALLED CONSTRUCTION ELEMENT

[76] Inventor: Johan J. M. E. Weyts, Bisschopsdreef 13, 8310 Brugge (Sint-Kruis), Belgium

[21] Appl. No.: 581,040

[22] Filed: Feb. 17, 1984

[30] Foreign Application Priority Data

Feb. 25, 1983 [NL] Netherlands ........................ 8300719

[51] Int. Cl.⁴ ........................ B31D 3/02; B32B 31/04; B32B 31/22
[52] U.S. Cl. .................................. 156/197; 156/293; 156/294
[58] Field of Search ................ 156/197, 245, 293, 294

[56] References Cited

U.S. PATENT DOCUMENTS

| | | | |
|---|---|---|---|
| 2,593,714 | 4/1952 | Robinson | 156/197 |
| 2,815,795 | 12/1957 | Poel | 156/197 |
| 3,013,584 | 12/1961 | Reed et al. | 156/197 |
| 3,064,317 | 11/1962 | Dobson | 156/197 |
| 3,152,033 | 10/1964 | Black | |
| 3,678,795 | 8/1972 | Elkin | 156/185 |

FOREIGN PATENT DOCUMENTS 3044872 8/1982 Fed. Rep. of Germany .
6910502 1/1970 Netherlands .

Primary Examiner—Caleb Weston
Attorney, Agent, or Firm—John P. Snyder

[57] ABSTRACT

A method of making a double-walled element utilizing a hollow tube for the inside and another hollow tube with greater dimension for the outside and a cell-structure to fill up the space between the two.

17 Claims, 12 Drawing Figures

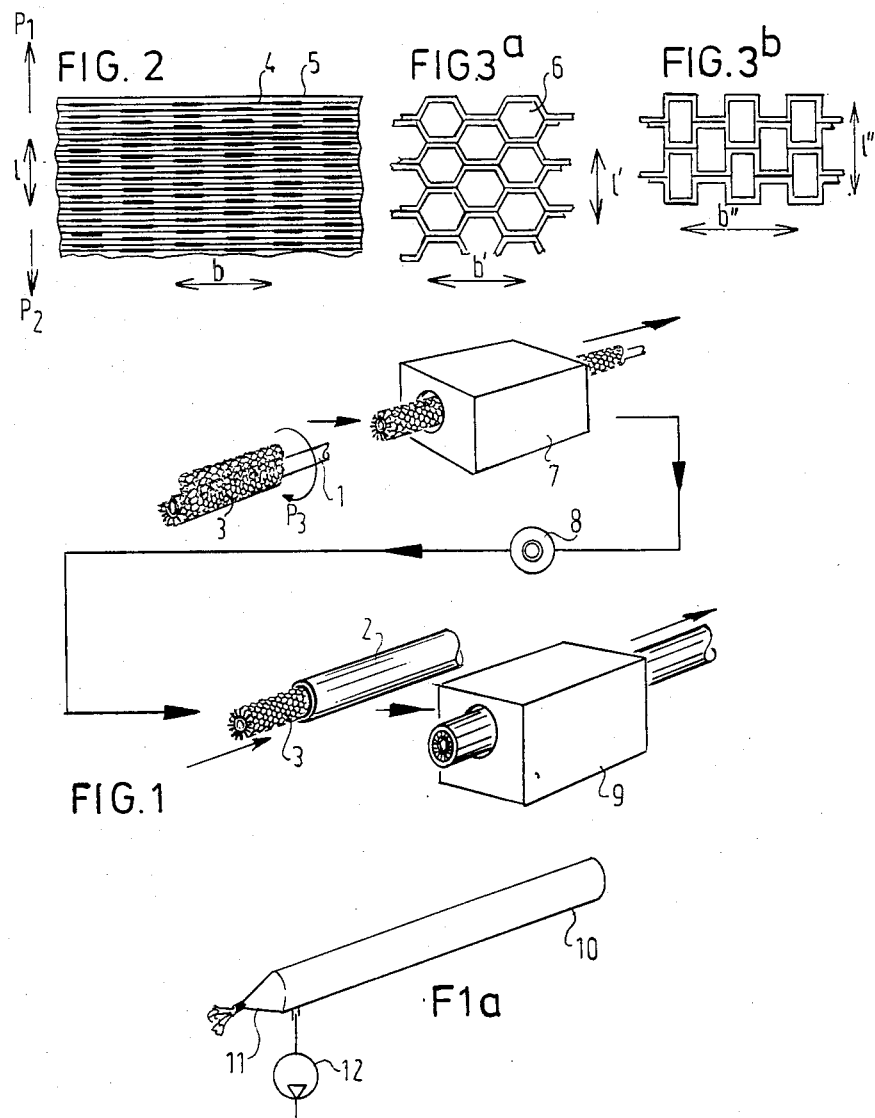

METHOD FOR THE FABRICATION OF A DOUBLE-WALLED CONSTRUCTION ELEMENT

The invention is related to a method for the fabrication of a double-walled element, utilising a hollow tube for the inside and another hollow tube with greater dimension for the outside and a cell-structure to fill up the space between the two.

The fabrication of double-walled constructions with a cell structure as spacer, so-called sandwich structures, has been known in various ways. It causes more problems to assemble hollow structures such as tubular elements with a honeycomb structure, because a honeycomb is difficult to manipulate and to machine, due to the low resistance to damages.

The object of the invention is to create a method which allows to fabricate a construction element with a honeycomb structure without above mentioned problems.

The method of the invention includes the following steps:

machining an unexpanded, solid block in honeycomb to predetermined dimensions in such a way that the honeycomb in expanded situation fills up the total space between the outer and inner tubular elements, said expanded honeycomb being in close contact with adjacent surfaces of the inner- and outer tube respectively, expanding the machined block fixing one face of the expanded honeycomb to the inner tube calibrating the opposite face of the honeycomb assembling the outer tube over said opposite face, fixing of the opposite face of the honeycomb to the outer tube The advantage of the method:

the standard way of machining, utilising f.i. a standard milling machine, for the honeycomb is machined in unexpanded situation, which gives it the behavior of a massive block as soon as the honeycomb is expanded, it will be fixed to the inner tube, which given it a high strength and resistance for the calibration process, avoiding all possible damages during the manipulation the lack of high investment, which is normally needed to machine expanded honeycomb.

By this invention, the fixation of the honeycomb structure to the tubes can be obtained utilising an adhesion process, such as glue, solder etc. Depending on the choice of the adhesion process one has to applicate the corresponding operations, such as increasing the temperature for soldering.

In another application of the invention, the fixation of the honeycomb structure to the inner tube can be obtained by a vacuum method during which the assembly is put into a plastic bag. The folio creates a pressure in all directions, which ensures an equal assembling and a perfect adhesion.

It is preferable to utilise tubular elements for the outer and inner parts, because of the numerous advantages.

The double-walled tube, assembled with honeycomb structure as a spacer between the outer and inner tube, has a very high resistance to bending, torsion, pressure, buckling. It is obvious that such a construction represents a very high resistance to fatigue-load under dynamic charges, since the honeycomb has a diverging effect of the charges.

The high strength for very low weight makes this construction element extremely suitable for many applications under dynamic charges.

On top of that the construction element remains a very strong assembly even after a local damage by high local charges, this due to the charge-diverging effect of the honeycomb. The major reason for that diverging effect of the honeycomb is the perpendicular position of the walls of the honeycomb cells to both the inner and outer tubular element which ensures an optimal diverging effect.

A further explanation of the invention will be given in the detailed description of various embodiments herebelow.

In the drawing is:

FIG. 1 a schematic view of the method for the fabrication of a construction element according to the invention, FIG. 2 a view of an unexpanded honeycomb block, FIG. 3a and 3b a view of a normal and overexpanded honeycomb respectively, FIG. 4 a perspective view of a possible application for the construction element, FIG. 5 a detailed view of a construction element marked with V in FIG. 4, FIG. 6 a detailed view as in FIG. 5 of another embodiment of the tubular construction element, FIG. 7a and b each a view of the unexpanded honeycomb block, and expanded honeycomb respectively, applicable in the tubular structure of FIG. 6, FIG. 8 half a cross-section of an alternative embodiment of a construction element.

FIG. 9 a longitudinal section of another embodiment.

A further explication of the basic method will be given following FIGS. 1, 2 and 3.

In the drawing the construction element is composed by an inner tube 1, outer tube 2 with a larger dimension that creates sufficient space to receive the honeycomb structure 3.

The honeycomb structure 3 can be formed in various dimensions, but according to the invention the honeycomb is obtained by expanding a block 4 in FIG. 2 comprising superposed sheets of material, locally bonded between 2 sheets with a glue in such a way that the bonded strips between all pair numbers have the same localisation and that all bonded strips between the unpaid numbers are localized between the stripes of the pair numbers. The expansion of such a honeycomb block in the direction of the arrow P1 and P2 creates a honeycomb structure according to FIG. 3a and 3b. It is obvious that the total length "l" will be enlarged whereas the width "b" will be diminished, as soon as the desired form is achieved The rate of expanding determines the shape of the cell 6 hexagonal or rectangular and the dimension "b" and "l".

A characteristic feature of the invention is the possibility of machining the front and back side respectively of the unexpanded block in FIG. 2, since the pressed sheets 4 behave themselves as a total massive block. Further explanation of a possible pre-machining is given here-under.

The obtained honeycomb structure, according to FIGS. 3a and 3b with a pre-determined thickness, is to be would around the inner tube 1 in the direction of the arrow P3, that is after either the outer side of the inner tube 1, or the inner side of the honeycomb structure has received an arbitrary adhesive. This adhesive could be a thermo-reactive synthetic or any other material, like solder with a suitable melting temperature, in which case the adhesion is established through the addition of heat in an oven 7, see FIG. 1.

It will be obvious that owing to the said winding all the walls of the cells are perpendicular to the outer face of the tube 1.

After adhesion, the assembly formed by inner tube 1 and honeycomb 3 can be calibrated by a suitable tool 8, in such a way that the outer dimension of the honeycomb structure obtains the right shape to be able to slide the outer tube 2 over the assembly. This calibration step is easy, since the honeycomb structure 3 is very well supported by the inner tube through the adhesions process.

The same steps are applicable for the fixation of the outer tube 2 to the honeycomb 3. If necessary the construction element will be put again in an oven 9.

Another way of fixing the honeycomb structure on the tube 1 either with or without the use of the oven 7 is shown in FIG. 1a. A flexible tube 10 is to be put over the assembly of inner tube 1 and honeycomb structure 3, and closed on the side 11. A pump 12 creates a vacuum into the tube 10. This creates an equal pressure on the honeycomb structure in the direction of the center of the inner tube 1 which means an optimal compression. Such a method is suitable for any embodiment where equal pressure is needed, using any kind of adhesive with or without thermo-heating products.

This construction element has a lot of possible embodiment.

FIG. 4 shows one embodiment of a framed construction in which the construction element with very low weight and very high strength permits an exceptional span width. This gives the possibility to create, without supplementary supports, framed building for big aircrafts.

FIG. 5 shows a construction element in which both the outer and the inner tube have a circular cross section. It is clear that the honeycomb structure 3 is perpendicular in all directions to the surfaces of both the inner and the outer tube 1 and 2.

FIG. 6 shows a construction element where the inner tube 1 has a circular cross-section, and the outer tube 2 a rectuangular or square cross section. The only adaptation needed is the shape of the honeycomb 3', to make sure that both the inner and the outer tube 1 and 2 remain supported in all areas.

For this purpose a package 4 constructed with sheets 5 will be machined in a suitable way. The surface 13 from FIG. 7a will receive a hollow shape. Once this machined honeycomb is expanded and wound around the inner tube 1, the shape will fit correctly into the outer tube 2 and the points A will reach the corners of the square section.

Figure 4:
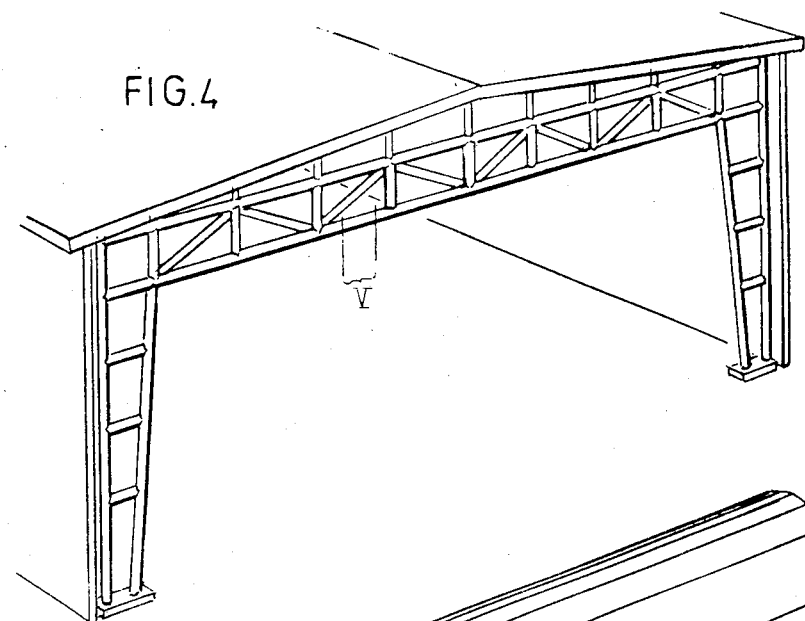
Figure 5:
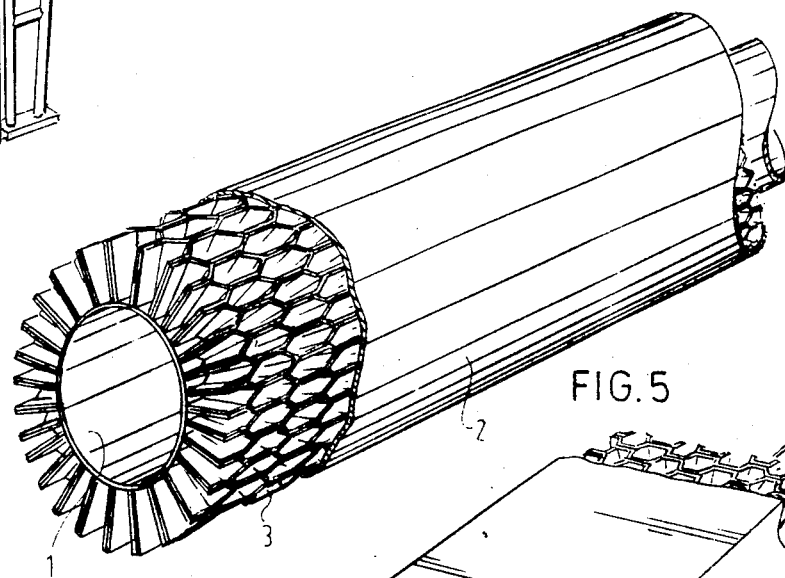
Figure 6:
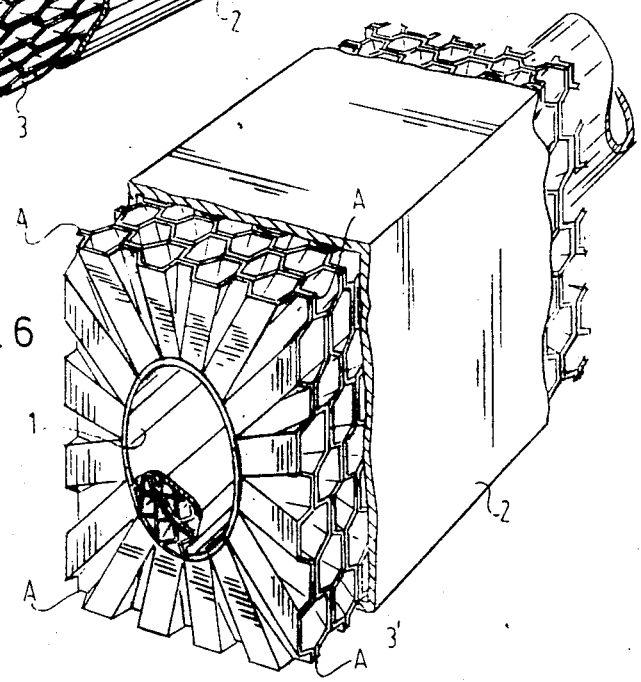
Figure 7B:
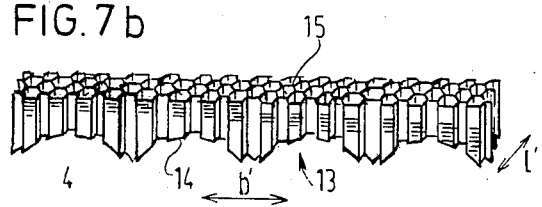
Figure 7A:
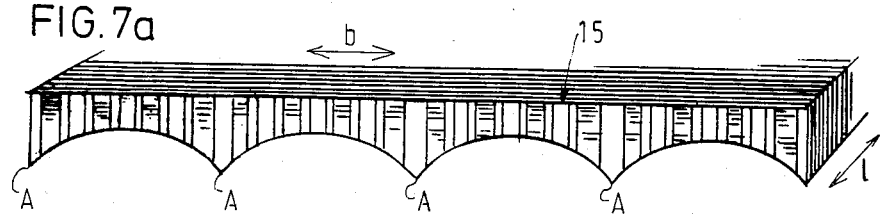
Figure 8:
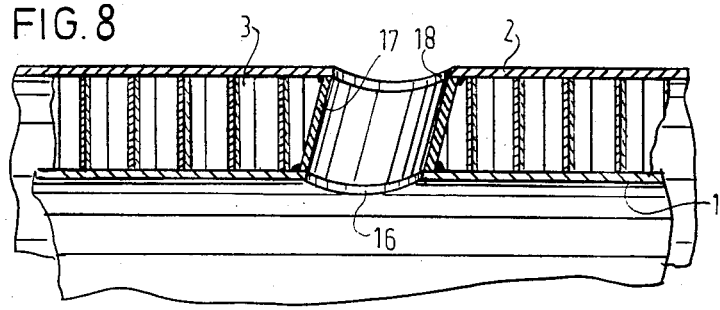
FIG. 8 shows a cross section of a construction element in which a tube 17 is fit into the assembly. This process gives the possibility to put any fixation or bushing through the doubled walled construction.
Figure 9:
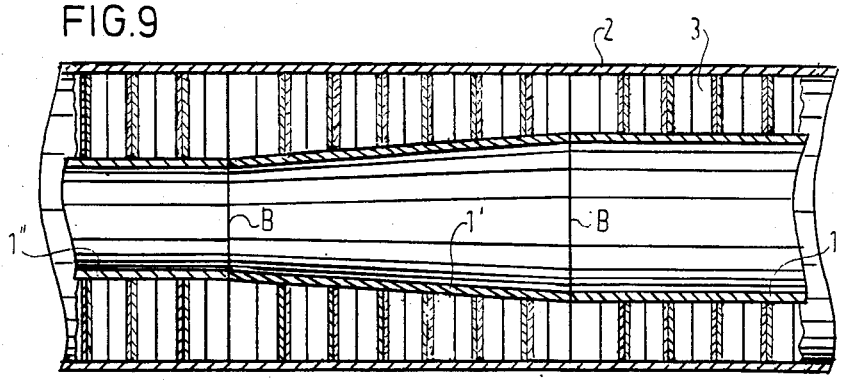
FIG. 9 shows another embodiment in which the three parts 1, 1', 1" have various cross sections from which one has a continuously decreasing dimension.

The invention is not limited to the embodiments that have been mentioned.

Other embodiments might be thinkable, such as a central part of framed constructions.

What is claimed is:

1. The method of making a honeycomb-reinforced structure which comprises the steps of:
   (a) providing a stack of intermittently joined elongate strips which will form a honeycomb structure when expanded in the direction perpendicular to the strips and machining said stack to present opposite side faces, defined by the cumulative opposite side edges of the strips, which are in predetermined relationship to each other and with the stack presenting a lengthwise dimension commensurate with the lengths of the strips and a widthwise dimension commensurate with the cumulative thickness of the strips;
   (b) expanding said stack in the direction perpendicular to said strips to form a honeycomb structure whose widthwise dimension has been increased from said widthwise dimension of the stack to a first predetermined value while the lengthwise dimension of the honeycomb structure has decreased from said lengthwise dimension of the stack to a second predetermined value and honeycomb cells extend between said opposite side faces;
   (c) wrapping and affixing the expanded stack in its widthwise direction around a hollow tubular member having an outer surface whose circumference is equal to said first predetermined value of the widthwise dimension of the honeycomb structure so that said one opposite side face of the honeycomb structure contacts said outer surface and completely encompasses the hollow tubular member to deform the other opposite side face of the honeycomb structure into a predetermined shape; and
   (d) fitting the structure of step (c) lengthwise into an outer hollow tubular member having an inner surface conforming to said predetermined shape of said other opposite side face of the structure of step (c) and joining said other opposite side face to said inner surface to form the honeycomb-reinforced structure.

2. The method as defined in claim 1 including the step of calibrating the structure of step (c) to conform its predetermined shape to the inner surface of said outer tubular member.

3. The method as defined in claim 2 wherein said hollow tubular members define an annular volume between them which is filled by the honeycomb structure.

4. The method as defined in claim 1 wherein the machining of step (a) contours said opposite side faces to be flat and parallel.

5. The method as defined in claim 1 wherein the machining of step (a) contours one of said side faces in a series of part-circular configurations.

6. The method as defined in claim 1 wherein the machining of step (b) tapers one of said opposite side faces.

7. The method as defined in claim 1 including the step of calibrating the structure of step (c) to conform its predetermined shape to the inner surface of said second rigid member.

8. The method as defined in claim 7 wherein said first and second rigid members define an annular volume between them which is filled by the honeycomb structure.

9. The method of making a honeycomb-reinforced structure which comprises the steps of:
   providing a stack of rectangular strips which are joined at spaced areas along their lengths so that opposite side faces of the stack are defined by opposite longitudinal edges of the strips;

machining said stack so that said opposite side faces are accurately formed;

expanding the stack to form a honeycomb structure;

wrapping the honeycomb structure around an inner member whose outer surface dimensionally conforms to one opposite side face of the honeycomb structure to form a subassembly whose outer surface is defined by the other side face of the honeycomb structure as deformed by said wrapping;

calibrating said outer surface of the subassembly to predetermined shape;

inserting the calibrated subassembly into a tubular member whose inner surface conforms with said predetermined shape; and joining the inserted subassembly to said tubular member to form the honeycomb-reinforced structure.

10. The method as defined in claim 9 wherein said inner member and said tubular member define an annular volume between them which is completely filled by the honeycomb structure.

11. The method of making a honeycomb-reinforced structure which comprises the steps of:

providing inner and outer tubular members which when in coaxial relation define an annular volume between them;

providing a substantially solid stack of intermittently joined strips which may be expanded into honeycomb configuration having a volume exceeding that of said annular volume;

machining said stack dimensionally;

expanding the machined stack until one side face thereof conforms with the outer surface of said inner tubular member, wrapping such one side face around said inner tubular member and affixing it thereto to form a substantially rigid subassembly in which the other side face of the machined and expanded stack defines the girthwise shape of the subassembly;

calibrating said grithwise shape of the subassembly so that it may be inserted into said outer tubular member;

inserting the subassembly into the outer tubular member and affixing it thereto to provide the honeycomb-reinforced structure.

12. The method of making a honeycomb-reinforced structure which comprises the step of:

(a) providing an unexpanded honeycomb structure in which a stack of strips are in face-to-face relation and joined at spaced areas along their lengths so that opposite side faces of the unexpanded honeycomb structure are defined by opposite edges of the strips;

(b) machining the unexpanded honeycomb structure of step (a) so that said opposite side faces are contoured in predetermined fashion;

(c) expanding the unexpanded honeycomb structure of step (b) to form an expanded honeycomb structure in which one side face thereof defines a first face of open honeycomb form and the other side face defines a second face of open honeycomb form in which cells of the expanded honeycomb structure extend between said first and second open honeycomb faces;

(d) engaging said first face of the expanded honeycomb structure upon a rigid first member having a contoured surface which does not conform to the contour of said first face and deforming the expanded honeycomb structure to conform said first face with said contoured surface while said second face is also altered in contour and the cells of the honeycomb structure diverge in one direction between said first and second faces, and fixing said first face of the deformed expanded structure to said surface of the first member to form a subassembly; and (e) engaging the altered contour of the second face of the subassembly with a surface of a second rigid member which is contoured in conformity with the altered contour of said second face and fixing second face of the subassembly to the contoured surface of said second rigid member to form the honeycomb-reinforced structure.

13. The method as defined in claim 12 wherein said first and second rigid members define a volume between them which is completely filled by the honeycomb structure.

14. The method as defined in claim 13 wherein said volume is annular.

15. The method as defined in claim 14 wherein the machining of step (b) contours said opposite side face to be flat and parallel.

16. The method as defined in claim 14 wherein the machining of step (b) contours that face of the unexpanded honeycomb structure corresponding to said first face of the expanded honeycomb structure in a series of part-circular configurations.

17. The method as defined in claim 14 wherein the maching of step (b) contours that face of the unexpanded honeycomb structure corresponding to said first face of the expanded honeycomb structure to provide a taper.

* * * * *